UNITED STATES PATENT OFFICE 2,087,422

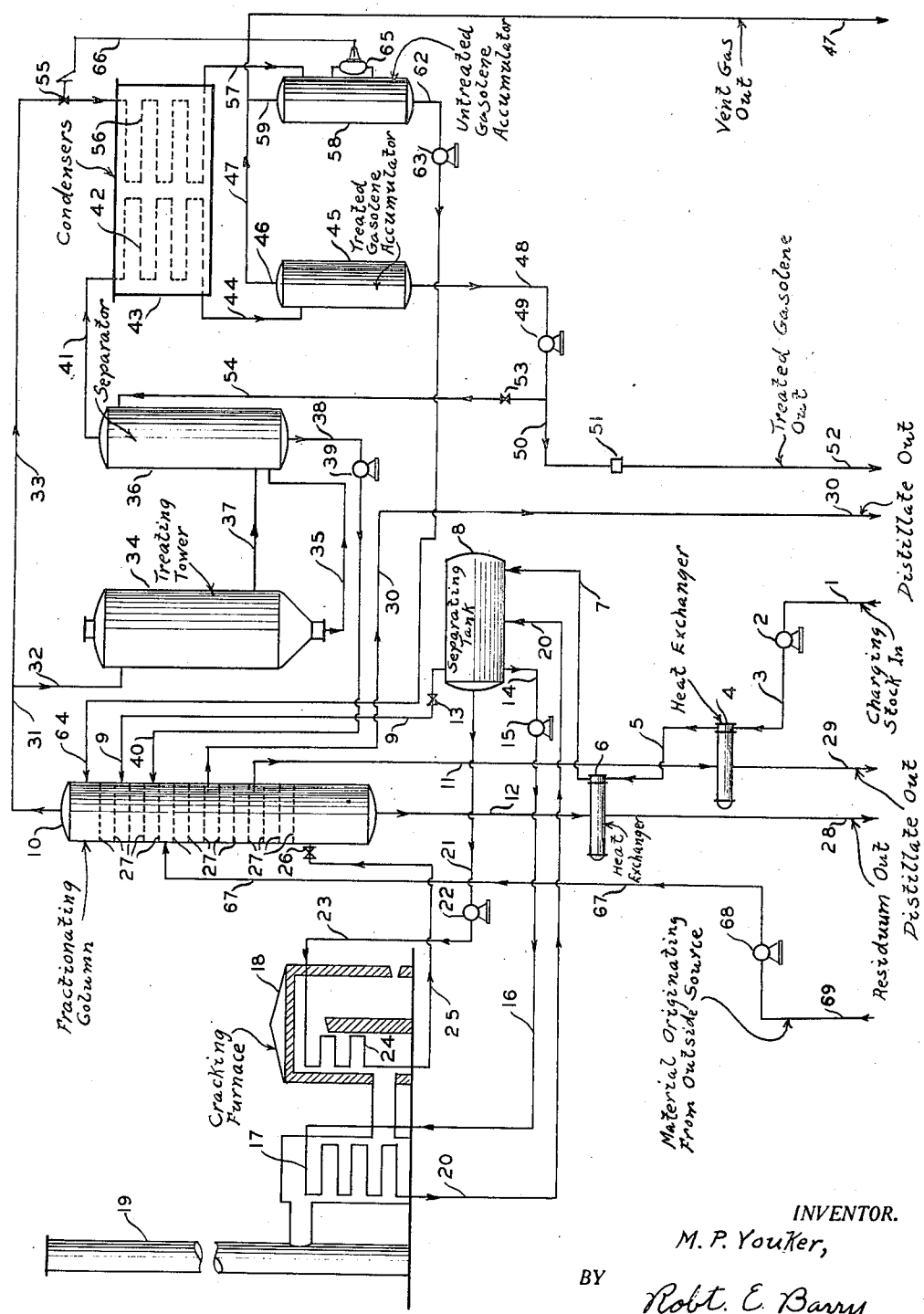

PROCESS AND APPARATUS FOR TREATING HYDROCARBON OILS

Malcolm P. Youker, Bartlesville, Okla., assignor to Phillips Petroleum Company, Bartlesville, Okla., a corporation of Delaware Application February 23, 1933, Serial No. 658,171

2 Claims. (Cl. 196—94)

The present invention relates to a process and apparatus for treating hydrocarbon oils, such as crude oil, gas oil, fuel oil etc., to produce a maximum amount of finished gasoline, with a minimum amount of handling and expense.

My invention comprises a series of steps whereby raw oils are subjected to skimming and/or cracking, fractionation, chemical or catalytic treatment of the gasoline formed, and condensation and cooling of the various products. These steps are so correlated as to produce the maximum amount of finished marketable gasoline in a more simple and economical manner than heretofore known in the art.

A particularly novel feature of my invention resides in the method and apparatus I employ in connection with the chemical or catalytic treatment steps to render these steps more effective and less expensive. This is accomplished by use of automatically controlled devices which allow only those gasoline vapors which are to be treated and removed as a final product of the process, to pass through the treating steps and excludes from the treating steps those gasoline vapors which are to be condensed and returned as reflux to the fractionating column. Since these latter vapors usually constitute the larger portion of the total vapors leaving the fractionating column, the economy of such a system is apparent. To allow the entire mass of vapors to pass through the treating steps would involve a waste of chemicals or other treating material representing those vapors returned as reflux, and would require that the treating equipment be unnecessarily large.

Other advantages and novel features of my invention as compared with other and earlier methods will become apparent from the description of my process.

For a clearer understanding of my invention, and to illustrate one of the forms of apparatus suitable for carrying out my objects, reference is to be had to the accompanying drawing, which is more or less a diagrammatic view of one form of my apparatus.

In processing crude oil containing gasoline, the oil passes from storage, not shown, through line 1 to pump 2, and is pumped through line 3 to heat exchanger 4, where it is heated by indirect heat exchange with a gas oil or similar stream leaving fractionating tower 10 through line 11. The oil leaving heat exchanger 4, passes through line 5 to a heat exchanger 6, in which it is further heated by indirect heat exchange with residual oil leaving the bottom of fractionating tower 10 through line 12. The oil then continues through line 7 to separating tank 8, which it enters at a temperature of about 300 to 350° F. as a result of the indirect heat exchange described. At these temperatures, a portion of the crude oil is vaporized; the vapors passing through line 9 and valve 13 into fractionating tower 10.

In order to maintain the oil in separating tank 8 at a predetermined temperature, in this case about 450° to 500° F., a portion of the unvaporized oil is circulated by pump 15, through line 14, line 16, heating coil 17, (in which it is heated to 500–600° F. by waste heat contained in the flue gases leaving the furnace 18 on their way to stack 19), and line 20, back to tank 8, where it mixes with the incoming crude oil from pipe 7. The temperature of the oil in tank 8 can thus be maintained sufficiently high to remove all the gasoline present in the crude oil, or it may be so regulated as to remove only a portion of the gasoline, or I find it at times desirable to heat the crude oil to a predetermined temperature without allowing any of the vapors to escape to tower 10, and this may be accomplished by closing valve 13. Valve 13 may also be kept closed when the oil processed contains no low boiling materials vaporizable at the temperature obtained by the previously outlined heat exchange steps.

Oil from separating tank 8 is removed through line 21 by pump 22, and is charged through line 23 to furnace heating coil 24, in which it is raised to a cracking or conversion temperature of from 750° F. to 1050° F. The highly heated oil then passes through transfer line 25 and back pressure valve 26, (whereby a pressure from 500 to 3500 pounds per square inch is maintained on the heating coil 24), into the fractionating tower 10 which is equipped with bubble trays 27. In tower 10, vapors formed as a result of the high temperatures in coil 24, are separated from any unvaporized oil and pass upward while subjected to a controlled refluxing action due to the introduction of liquid reflux from one or several sources, as will be subsequently described. The unvaporized oil leaves the bottom of fractionating tower 10 through line 12, passes through heat exchanger 6 where it is cooled by heat exchange with the relatively cooler crude oil, as before described, and passes thence through line 28 to a cooler (not shown), and to final storage (not shown). A stream of gas oil is taken from one of the bubble trays 27 and is passed through line 11 to heat exchanger 4, where it gives up heat to the incoming crude oil in the previously described manner, and then passes by means of line 29 to a cooler (not shown), and to final storage (not shown).

Another stream, lighter than the gas oil stream, may also be removed from one of the bubble trays 27 above the point where the gas oil stream is removed; in which case it passes through line 30 to a cooler (not shown), and to final storage (not shown).

The refluxed vapors freed of undesirable higher boiling constituents, leave fractionating tower 10 by means of line 31, which is divided into branch lines 32 and 33. Branch line 32 leads to the treating steps of the process, while branch line 33 leads to steps wherein some of the vapors are condensed to be returned as reflux liquid to tower 10. The portion of vapors or first stream of vapors passing through branch line 32 enters treating tower 34 which contains treating material such as clay, fuller's earth, etc., as is well known in the art. In treating tank 34, certain impurities are condensed into higher boiling materials, called polymers, some of which collect in the bottom of treating tower 34 and are passed through line 35 to a bubble tower polymer separator 36. The treated vapors containing some entrained polymers pass through line 37 to polymer separator 36 where the higher boiling polymers are condensed out by refluxing with a portion of the finally condensed treated gasoline. The liquid polymers are removed from polymer separator 36 through line 38 by means of pump 39, and are pumped thereby through line 40 to fractionating tower 10 where it serves as a portion of the reflux liquid required by fractionating tower 10, and in which it is freed of any lower boiling materials it may contain, by the vapors passing upward through the tower 10. The treated vapors leave polymer separator 36 through line 41 and are condensed in coil 42 which is mounted in condenser box 43, and the condensate and normally gaseous hydrocarbons which remain uncondensed pass through line 44 into accumulator 45. The gaseous hydrocarbons pass out of the accumulator 45 by means of a line 46 into vent gas header 47. The condensed treated gasoline is removed from accumulator 45 through line 48 by pump 49 which forces the gasoline through line 50, meter 51 and line 52 to storage (not shown). A portion of the gasoline passing through line 50 is diverted through valve 53 and line 54 to polymer separator 36 and serves therein as reflux in the manner above described.

The remaining portion of vapors or second stream of vapors leaving fractionating tower 10 and passing through branch vapor line 33, proceeds through a back-pressure valve 55 into condenser coil 56 which is also mounted in condenser box 43. Some of the vapors are condensed in coil 56 into untreated gasoline, and this gasoline and the remaining uncondensed gases pass through line 57 into reflux accumulator 58. The normally gaseous vapors or uncondensed vapors pass through line 59, into vent gas header 47. The condensed gasoline is removed through line 62 by pump 63, and forced through line 64 to fractionating tower 10, wherein it is used as reflux. It is in connection with this reflux that apparatus is introduced for controlling automatically the proportions of the vapors entering branch lines 32 and 33 from vapor line 31. This is accomplished in the following manner:

Reflux accumulator 58 has, in conjunction with it, a liquid level actuated control device 65, by means of which the back pressure valve 55 may be operated. Using valve 55, let us assume that the quantity of vapors entering branch line 33 is too great, that is, the amount of condensate formed therefrom, is greater than needed for reflux in fractionating tower 10. In such case, the level of liquid in reflux accumulator 58 will rise above a predetermined level, and will actuate device 65 which, by means of connecting elements 66, will partially close valve 55 and thus increase the back pressure in branch line 33 to force more vapors to pass through branch line 32. If insufficient vapors pass through line 33, and the liquid level in reflux accumulator 58 drops too low, the control device 65 will act in the reverse manner, and cause valve 55 to open and allow more vapors to pass through line 33 and less through line 32. Due to the back pressure in line 32 caused by the resistance of the treating steps to the passage of vapors, the tendency will always be for all of the vapors to pass through line 33, and this fact enables me to use a controlled back pressure valve such as 55 to obtain the described improvements.

Due to the fact that the vapors formed in the cracking operation are highly superheated, I find it desirable to make use of the excess heat contained therein to distill material originating from an outside source, such as "slop" distillate, treated pressure distillate, etc. Accordingly, I provide a line 67 leading into the fractionating tower 10 and fed by pump 68 from line 69 which leads from the external source of supply (not shown).

While I have described a preferred application of the invention, it will be readily apparent that numerous variations can be introduced which will fall within the scope of my appended claims.

What is claimed and desired to be secured by Letters Patent is:

1. A process for treating hydrocarbon oils in an improved manner, which comprises removing as vapors and introducing into a fractionating zone the low boiling constituents of said hydrocarbon oils by means first, of indirect heat exchange with one or more streams of reflux liquid leaving the said fractionating zone, second by indirect heat exchange with a stream of separated unvaporized residual oil leaving the said fractionating zone, and third, by direct interchange of heat with a portion of said hydrocarbon oils from which the low boiling constituents have been removed or are in process of removal, and which said portion has been heated in a restricted stream by the waste gases leaving a furnace, which said furnace supplies the principal heating requirements of the said process, passing the bulk of the unvaporized portion of said hydrocarbon oils after the removal of said low-boiling constituents, in a restricted stream through said heating furnace where it is heated to a cracking temperature under superatmospheric pressure, expanding the so heated oil into said fractionating zone wherein the vapors formed as a result of said cracking temperatures are separated from said unvaporized residual oil and pass upward through said fractionating zone and are commingled with the vapors of the said low-boiling constituents, and wherein the commingled vapors are subjected to a controlled refluxing action to remove higher boiling constituents therefrom, removing said stream of separated unvaporized residual oil which serves to heat up said hydrocarbon oils by indirect heat exchange as hereinbefore mentioned, removing said one or more streams of liquid from the medial portion of said fractionating zone and using them to heat up said hydrocarbon oils by indirect heat exchange as hereinbefore mentioned, removing the uncondensed vapors from the upper portion of said fractionating zone, and passing said uncondensed vapors in a stream divided so that one portion of said uncondensed vapors will pass through a treating zone, wherein said portion is purified and separated from undesired impurities, returning said impurities to said fractionating zone, condensing said treated vapors and removing them from the process, passing the other portion of said uncondensed vapors directly to a condensing zone, condensing and collecting said other portion and returning condensate thus formed to the upper portion of said fractionating zone, and causing the liquid level of the last mentioned collected condensate to directly regulate the quantity of the last mentioned uncondensed vapors entering said condensing zone, whereby the division of said vapors leaving said fractionating zone is accomplished.

2. An apparatus for the continuous treatment of hydrocarbon oils, including means for removing substantially all the low-boiling constituents of said hydrocarbon oils prior to cracking the higher boiling constituents of said hydrocarbon oils, means for cracking said higher boiling constituents, means for fractionating commingled vapors from both of said operations, means for dividing vapors leaving said fractionating means, means for treating a portion of said divided vapors, means for separating treated vapors from impurities condensed in said treating means, means for returning said impurities to said fractionating means and for condensing said treated vapors separately from any other vapors, means for collecting and removing condensate formed from said treated vapors, means for separately condensing the other portion of said vapors leaving said fractionating means, means for collecting condensate from said other portion of said vapors, means for utilizing the liquid level of the condensate in the last mentioned means for directly controlling the quantity of vapors fed to the last mentioned condensing means from said fractionating means, means for returning said last mentioned condensate to said fractionating means, means for removing several streams of reflux condensate from different portions of said fractionating means, means for cooling same by means of indirect heat exchange with said hydrocarbon oils to heat said hydrocarbon oils before said removal of low-boiling constituents therefrom and removing same from the system, means for removing unvaporized residual oil from the lower portion of said fractionating means and for cooling same by means of indirect heat exchange with said hydrocarbon oils to further heat said hydrocarbon oils before said removal of low-boiling constituents therefrom before removing same from the system, and means for introducing into an intermediate portion of said fractionating means liquid obtained from a source external to and independent of said process.

MALCOLM P. YOUKER.